United States Patent [19]

Daus, Jr. et al.

[11] Patent Number: 4,648,734
[45] Date of Patent: Mar. 10, 1987

[54] CORNER CONNECTOR ASSEMBLY

[75] Inventors: John J. Daus, Jr.; Henry E. James, both of Evansville, Ind.

[73] Assignee: Anchor Industries, Inc., Evansville, Ind.

[21] Appl. No.: 641,710

[22] Filed: Oct. 5, 1984

Related U.S. Application Data

[62] Division of Ser. No. 446,372, Dec. 2, 1982.

[51] Int. Cl.⁴ .............................................. F16B 7/18
[52] U.S. Cl. .................................... 403/170; 403/343; 403/379; 403/291; 52/126.1; 182/184; 248/600; 248/622
[58] Field of Search ........................ 272/50, 52, 54, 56, 272/67, 68, 110; 248/600, 622, 578, 566, 405, 161; 52/126.1, 126.2; 411/344; 403/343, 287, 291, 104, 109, 217, 218, 378, 379, 304; 182/184

[56] References Cited

U.S. PATENT DOCUMENTS 3,365,194  1/1968  Strickland .............................. 272/50
4,056,327 11/1977  Daus, Jr. et al. ............... 403/172 X
4,432,683  2/1984  Polos ................................. 411/342 X

FOREIGN PATENT DOCUMENTS 825146  2/1951  Fed. Rep. of Germany ...... 248/600
600107  6/1978  Switzerland ....................... 52/126.1

*Primary Examiner*—Cornelius J. Husar
*Assistant Examiner*—Joseph A. Fischetti
*Attorney, Agent, or Firm*—Warren D. Flackbert

[57] ABSTRACT

A corner connector assembly for a tent characterized as a two-part casting arranged for a floating relationship, the latter serving advantages in assembling struts or eave bars having crimped areas proximate the ends thereof which cooperate with projections on the inner surfaces of hollow arms forming part of the assembly. The arrangement also includes a vertical adjustment feature for the leg supporting the connector, such involving upper and lower members, the upper member being rotatable within the lower member by means of a bolt riding along a spring, to accommodate for variations in the terrain or other supporting surface.

1 Claim, 3 Drawing Figures

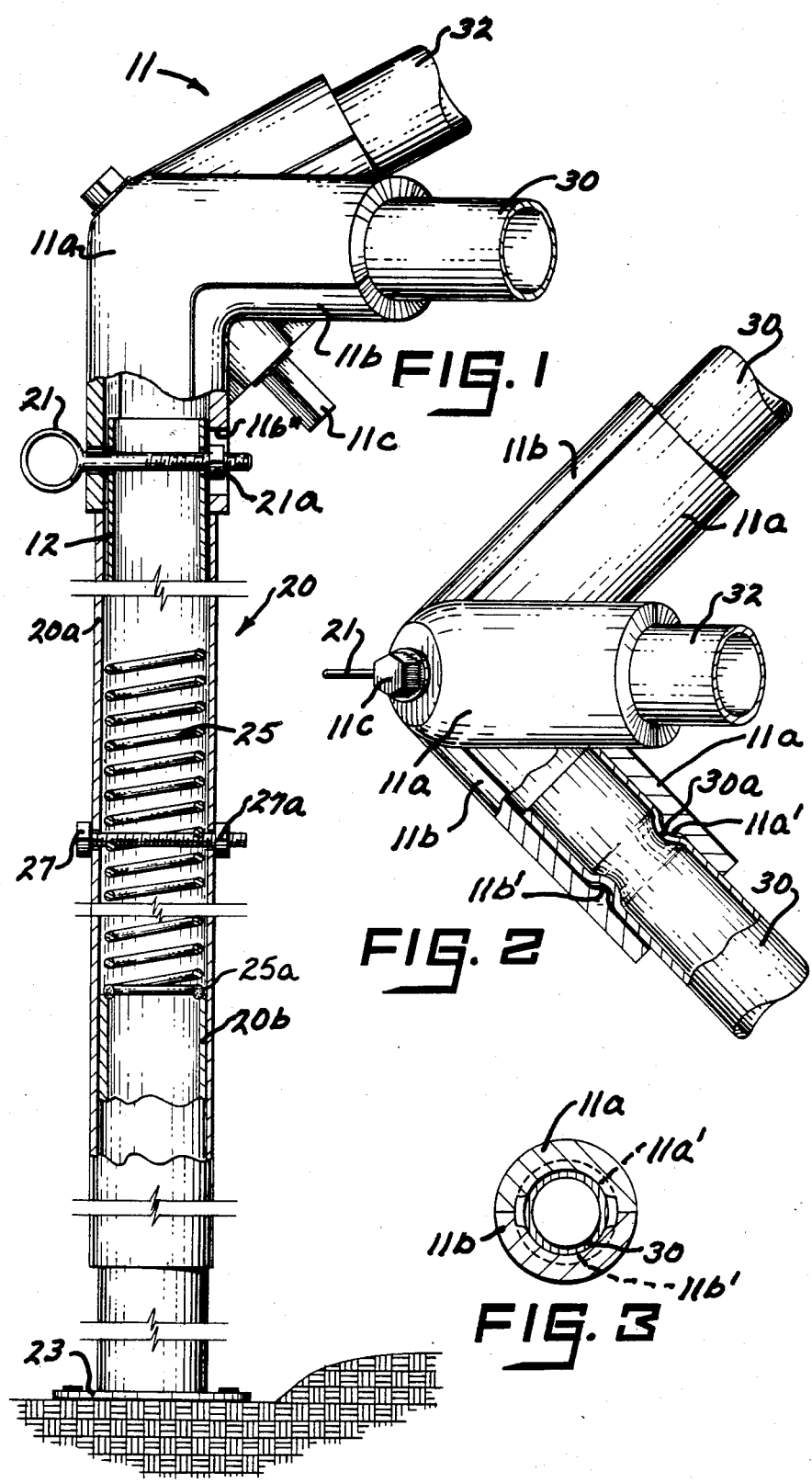

CORNER CONNECTOR ASSEMBLY

The present application is a division of patent application Ser. No. 446,372, filed Dec. 2, 1982.

As is known, the usage of frame-supported tents is increasing many-fold, including, by way of example, for meeting and/or trade show purposes, social functions, and the like. The aforesaid tents are typically supported by tubular metal frame members, where castings are commonly employed as corner and peak connectors. Even specialized types of tents or covering arrangements, such as those used along walkways, for cabanas and/or as door overhangs, generally require some form of connectors to achieve assembly.

Needs occasioned heretofore in assembling the preceding, include, for example, the positive and interlocking placement of the eave struts with the connectors; the desirable "floating" action for corner assembly, since the latter is typically a two-piece component; and, provision for readily accommodating the lengths of vertical supports due to uneven terrain or other surface supporting conditions particular to any given installation.

The invention presents a corner connector assembly which satisfies the preceding by (1) affording an eave strut which is crimped near the free ends thereof, such crimps being adapted to cooperably lock with corresponding projections on the inner surfaces of the corner connectors; (2) the provision of an enlarged opening in a side wall in one of the components of the corner connector which assists in achieving "floating" action during the assembly procedure; and, (3) the use of a two-part vertical strut or support, with one part being adjustable with respect to the other through an arrangement including a bolt movable along the turns of a fixed spring secured to the bottom part of the support.

In other words, the invention presents features which not only are of assistance in tent frame or like installations, assuring ease in positive corner assembly, but also adaptable to the terrain of the supporting surface. Thus, the improvements add a convenience factor and, as well, expedite such in view of the features broadly described hereabove.

In any event, a better understanding of the present invention will become more apparent from the following description, taken in conjunction with the accompanying drawing, wherein FIG. 1 is a view partially in section, of a corner connector assembly in accordance with the teachings of the present invention, directed not only to the corner connector itself but also to the vertical adjustment feature;

FIG. 2 is a detailed view, partly in vertical section, showing the positive interconnection of an eave strut with a corner connector; and, FIG. 3 is a view in vertical section showing further details of the instant invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the corner connector assembly of the invention includes a two-part member or casting 11 supported, when used, on a vertical leg or support 20, where the former is arranged for floating assembly to permit an interlocking relationship with horizontal eave bars or struts 30 and to receive an angled hip bar or strut 32. Leg support 20 is arranged to selectively provide for vertical adjustment, a feature particularly useful, for example, in the instance of an uneven or multi-level supporting terrain or surface.

The corner connector assembly 11 is defined by an outer section 11a and an inner section 11b, positively assembled by an angling bolt and nut arrangement 11c when tightened, which presents hollow arm portions for receiving the aforesaid frame members, i.e. the vertical support 20, the eave struts 30 and the hip strut 32.

The eave struts 30, extending between corner connector assemblies 11, are crimped, at 30a, proximate the ends thereof (see FIG. 2), while the hollow arm portions of sections 11a–11b which receive the eave strusts 30 include projections 11a'–11b' on the inner surfaces thereof (see FIGS. 2 and 3). In other words, the projections 11a'–11b' cooperate or interlock with each crimped portion 30a on the eave struts 30, so that, when fully assembled, i.e. with the tightening of the bolt and the nut arrangement 11c, the eave struts 30 cannot be pulled outwardly from the receiving hollow arm portions. As apparent in FIG. 3, and typically, the projections 11a'–11b' do not completely encircle the inner surfaces of sections 11a and 11b defining the hollow arms, but, instead, are partially disposed on each.

In connection with the need for maintaining outer section 11a and inner section 11b in a spaced-apart relationship so that the eave struts 30 can be introduced into the respective hollow arm portions therefor, an eyebolt 21 is provided, such extending through the vertical hollow arm portion of the corner connector assembly 11, i.e. through outer section 11a and inner section 11b thereof, and through a vertical connector 12 inserted therewithin. The eyebolt 21 serves to receive a guy line (not shown) and includes a nut 21a for securing purposes.

An enlarged free space 11b " is provided around the location of nut 21a in the inner section 11b of the corner connector assembly 11, such affording ease during assembly, i.e. permits the desired floating relationship between the outer section 11a and the inner section 11b. Restated otherwise, the arrangement permits a freedom of movement which would not be the instance if the threaded portion of the eyebolt 21 extended through an approximately same sized opening in the inner section 11b of the corner connector assembly 11. In the latter instance, sections 11a –11b could not be readily moved apart to receive the eave struts 30.

The vertical leg 20 which supports the corner connector assembly 11 is defined by an upper member 20a which overlies another lower member 20b, both typically cylindrical in cross-section, in a telescopic relationship, where the latter lower member 20b is secured to a base plate 23 selectively secured, through any desired means, to a supporting surface. A spring 25, spot welded or otherwise secured to the upper free end of the lower member 20b, at 25a extends upwardly within the upper member 20a. As evident, the upper member 20a also overlies a portion of the vertical connector 12 and abuts the bottom edge of the vertical hollow arm portion of the corner connector 11.

In any event, a threaded bolt 27, with associated nut 27a, extends laterally through the upper member 20a between the turns of the spring 25. In other words, the upper member 20a can be rotated along the length of the spring 25, passing from turn to turn, to achieve any preselected adjustment of height for leg 20. In this regard, and as stated, such a relationship permits added versatility in accommodating the placement of a tent where the supporting terrain is irregular or even stepped.

As evident from the prececing, the instant corner connector assembly presents various advantages in erecting a tent, including, as stated, a floating action between the upper and lower sections defining the corner connector to permit ready entry of eave struts or bars in a locked relationship, the latter serving positive positioning purposes, and, additionally, a simple approach for vertical adjustment of the leg supporting the corner connector for adaptability in the instance of an irregular supporting surface. In other words, the invention represents a combination of features which serve to erect the tent framework in both a positive and time saving manner.

The corner connector assembly described above is susceptible to various changes within the spirit of the invention, as, for example, proportioning; the line of division between the upper and lower sections of the corner connector; the configuration of the locking means between the eave struts or bars and the corner connector; the type of transverse element employed to ride along the spring for vertical adjustment; and, the like. Thus, the preceding description should be considered as illustrative and not as limiting the scope of the following claims.

We claim:

1. In combination with a two-part corner connector assembly defined as an outer member and an inner member, said outer member and said inner member each arranged to include arm portions at least one of which is vertically disposed, a tubular frame member defined as a leg interconnecting said vertically disposed arm portion, said tubular frame member including a first tubular member movable with respect to a second tubular member, said second tubular member supported on a receiving surface and seating a spring on its upper end which extends within said first tubular member, means securing said spring to said upper end of said second tubular member, and an elongated transverse member mounted on said first tubular member and extending across such between turns of said spring to selectively position said first tubular member and said two-part corner connector with respect to said receiving surface upon rotation of said first tubular member.

* * * * *